Jan. 11, 1955 E. COOKENBOO 2,699,492

ILLUMINATING DEVICE FOR TELEVISION APPARATUS

Filed May 10, 1952

Elwood Cookenboo
INVENTOR.

BY Charles E. Lightfoot
ATTORNEY 2,699,492
Patented Jan. 11, 1955

2,699,492

ILLUMINATING DEVICE FOR TELEVISION APPARATUS

Elwood Cookenboo, Houston, Tex.

Application May 10, 1952, Serial No. 287,083

2 Claims. (Cl. 240—73)

This invention relates to an illuminating device for television apparatus, and more particularly to an electric lamp and supporting means therefor adapted for use in connection with television sets.

Television sets as customarily used, are usually operated in a darkened or dimly lighted room in order to secure the maximum brilliance of the image produced, and the constant observation of the television screen under such conditions frequently results in discomfort to the eyes or even severe eye strain due to the brightness and constant flickering of the image.

Various means have been proposed for altering the lighting of television screens in an effort to reduce the eye strain caused by direct observation of the brilliantly illuminated image, such as by lighting the screen from the front or by illuminating the room from behind the observer, but no completely satisfactory method has been found heretofore for this purpose.

The present invention has for its chief object the provision of an illuminating device which may be applied to television sets and which will effectively illuminate the room without producing a glare or interfering with the proper illumination of the television screen.

Another object of the invention is to provide illuminating means which may be used to reduce the eye strain caused by long observation of a television screen, without the necessity for directly illuminating the screen from the front or from the view point of the observer.

A further object of the invention is the provision of a lamp which may be applied to a television set to indirectly illuminate the room from a position behind the screen, whereby ample lighting of the surroundings may be accomplished without substantially detracting from the brightness of the television image.

A still further object of the invention is to provide an electric lamp having supporting means by which the lamp can be readily applied to the back of a television set, and which may be readily adjusted for attachment to television cabinets of various sizes and constructions, there being means on the support for shielding the lamp to prevent the same from producing a glare.

The above and other objects and advantages of the invention will best be understood from the following detailed description, constituting a specification of the same, when taken in conjunction with the annexed drawings, wherein—

Figure 1:
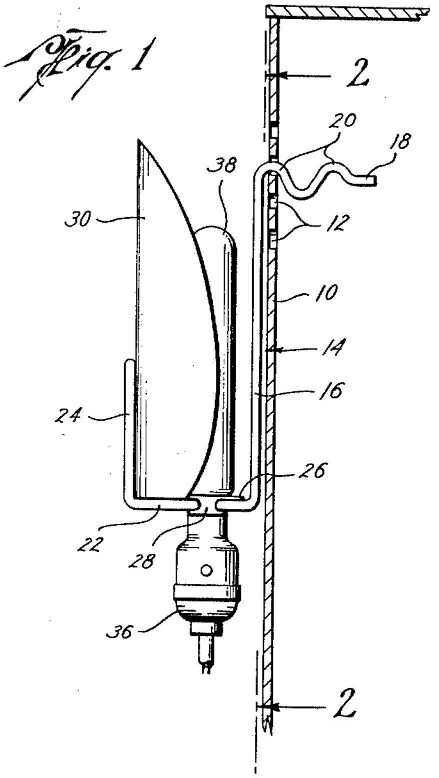
Figure 1 is a fragmentary side elevational view, partly in cross-section, showing the invention as applied to the back of a cabinet of a television set.

Referring now to the drawings in greater detail, the invention is shown in its application to the back of a cabinet, designated by the numeral 10, such as the cabinet of a conventional television set, which is provided with the usual ventilating openings 12, arranged in spaced relation throughout a portion of the area of the rear wall of the cabinet. The invention, in the present illustration, includes a supporting frame, which may take the form of a wire or rod generally indicated at 14, having upwardly extending portions 16, each formed with a sinuous extension 18 at its upper end. The extensions 18 may be formed with a number of loops or corrugations 20, any of which may engage the rear wall of the cabinet, when the extensions are inserted through the openings 12, whereby the frame may be securely attached to the cabinet. Each of the portions 16 of the support 14 is also bent at its lower end to form the outwardly extending portions 22 disposed substantially at right angles to the portions 16 and extending oppositely to the extensions 18, and each of the portions 22 is re-bent at its outer end, forming the loop 24 extending upwardly in spaced relation to the portions 16.

An annular, internally-threaded socket-receiving member 26, bridges the space between the outwardly extending portions 22 of the supporting frame 14, and is provided with outwardly extending lugs 28, which are bent downwardly and inwardly over the portions 22, to secure the annular member to the supporting frame.

A curved shield 30, of suitable sheet material, which may have a reflecting interior surface, is formed with a bottom extension 32, which extends substantially at right angles to the shield, in overlying relation to the portion 22 of the support member 14. The bottom extension 32 has an opening therethrough, through which the annular pocket-receiving member 26 extends, the socket-receiving member being preferably formed with an exterior annular flange 34, overlying the margin of the opening in the bottom extension, so that the latter is securely held in place on the support member by the socket-receiving member. The shield 30 may also be secured to the upwardly extending loop 24, in any suitable manner, as by welding, if desired.

Figure 2:
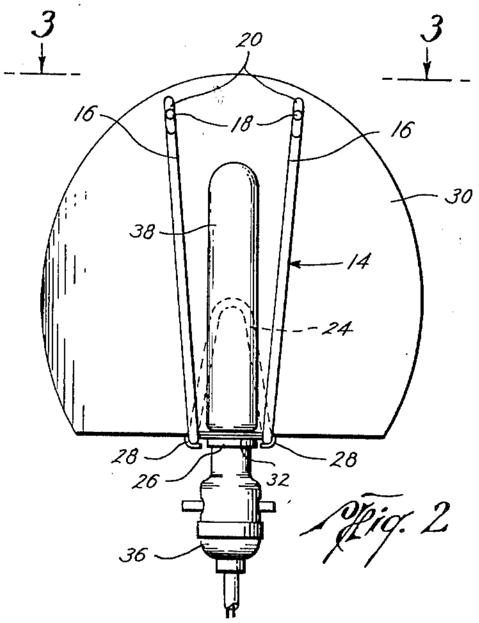
Figure 2 is a cross-sectional view taken along the line 2—2 of Figure 1, looking in the direction indicated by the arrows.
Figure 3:
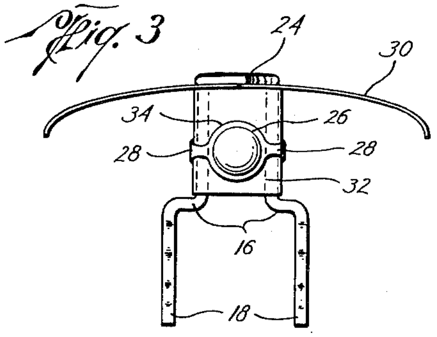
Figure 3 is a top plan view of the invention.
Figure 4:
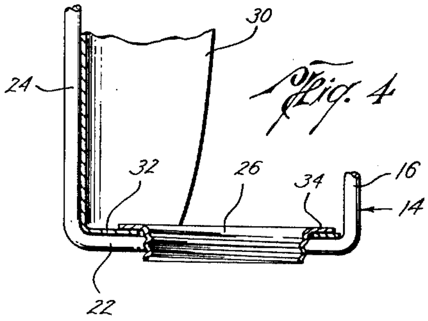
Figure 4 is a fragmentary view, partly in cross-section, and on a somewhat enlarged scale, showing details of construction of the invention.

An electric lamp socket 36, of conventional design having exterior threads at its upper end portion, may be threaded into the socket-receiving member 26 from below, in the manner shown in Figures 1 and 2, and an electric lamp, indicated at 38 may then be inserted in the socket, to complete the device for use.

In making use of the invention, as described above, the extensions 18 of the support frame 14 are inserted in certain of the holes 12 in the back wall of the television cabinet in a manner so that a loop corrugation 20 of each of the extensions is in engagement with the wall of the cabinet to support the device in hanging position therefrom. When the lamp 38 is lighted it will be seen that the ligth will be directed upwardly, and also laterally outwardly to some extent, and by selecting an electric lamp of suitable power an indirect light of low intensity will appear as a soft glow when observed from the front of the television set. It will be apparent that the shield 30 prevents any glare from the lamp, due to reflection of the light therefrom from a wall or other object behind the television set, and by making the interior surface of the shield a reflecting surface light will be directed therefrom toward the rear wall of the cabinet, so that an indirect lighting effect is obtained which does not interfere in any way with the observation of the television screen, but accomplishes a desirable illumination of the room.

In the event that the television cabinet is provided with some portion or object which projects beyond the rear wall thereof, making it desirable to support the lamp in outwardly spaced relation to the rear wall, the extension 18 of the supporting frame 14 may be inserted in the openings 12 to any desired distance to accomplish this object, and loops or corrugations 20 of the extension which are spaced from the portion 16 may thus be brought into engagement with the rear wall of the cabinet to maintain the lamp in such spaced relation.

It will thus be seen that the invention provides an illuminating device of simple design and strong construction, which is easily applied to the back of a television cabinet, and which is adjustable thereon, for accommodation to any desired conditions of use.

While the invention has been disclosed in connection with a specific embodiment, constituting a preferred form of the same, it will be understood that this is intended by way of illustration only, and that numerous changes can be made in the construction and arrangement of the various parts, without departing from the spirit of the invention, or the scope of the appended claims.

Having thus clearly shown and described the invention, what is claimed as new and desired to secure by Letters Patent is:

1. In a device of the character described, a supporting frame comprising spaced uprights terminating at their upper ends in horizontally disposed sinuous extensions and at their lower ends having horizontally disposed portions extending in a direction opposite to said extensions, an upright shield arranged in spaced relation to said uprights and having a horizontally disposed bottom extension projecting toward said uprights and supported on said portions, said bottom extension having an opening disposed between said portions, an annular socket supporting member extending through said opening and having an external annular flange overlying said bottom extension, spaced external lugs on said flange engaged about said portions to secure said bottom extension and said member to said portions.

2. In a device of the character described, a supporting frame comprising spaced uprights terminating at their upper ends in horizontally disposed sinuous extensions and at their lower ends having horizontally disposed portions extending in a direction opposite to said extensions, an upright shield arranged in spaced relation to said uprights and having a horizontally disposed bottom extension projecting toward said uprights and supported on said portions, said bottom extension having an opening located between said portions, an annular socket supporting member extending through said opening and having an external annular flange overlying the margin of the opening, and spaced external lugs on said flange engaged about said portions to secure said member and said bottom extension to said portions, said portions terminating outwardly of said shield in an upright loop secured to said shield.

References Cited in the file of this patent

UNITED STATES PATENTS

| | | |
|---|---|---|
| 803,819 | Getz | Nov. 7, 1905 |
| 1,222,573 | Claussen et al. | Apr. 10, 1917 |
| 1,564,024 | Scherer | Dec. 1, 1925 |
| 1,573,218 | Bieder | Feb. 16, 1926 |
| 1,721,639 | Rogovin | July 23, 1929 |
| 1,891,971 | Crane | Dec. 27, 1932 |
| 2,070,973 | Marsh | Feb. 16, 1937 |
| 2,298,870 | Cooper | Oct. 13, 1942 |